M. & T. R. WAY.
EARTH-AUGER.

No. 170,790. Patented Dec. 7, 1875.

Witnesses:—
W. H. Dodge
A. B. Paige

Inventor:—
M. and T. R. Way.
By Dodge & Son
Attys.

N. PETERS, PHOTO-LITHOGRAPHER, WASHINGTON, D. C.

UNITED STATES PATENT OFFICE.

MARTIN WAY AND THOMAS R. WAY, OF SPRINGFIELD, OHIO, ASSIGNORS OF ONE-HALF THEIR RIGHT TO GEORGE W. KELLEY, OF SAME PLACE.

IMPROVEMENT IN EARTH-AUGERS.

Specification forming part of Letters Patent No. 170,790, dated December 7, 1875; application filed November 8, 1875.

*To all whom it may concern:*

Be it known that we, MARTIN WAY and THOMAS R. WAY, of Springfield, in the county of Clarke and State of Ohio, have invented certain Improvements in Earth-Boring Machines, of which the following is a specification:

Our invention consists in the combination of a vertically-sliding frame, provided with a vertical shaft, and hand-cranks and gearing for driving the same, and a boring-cylinder attached to the lower end of the shaft by a universal joint; also, in providing the main frame with an arm to support the boring-cylinder while the earth is being discharged; also, in arranging the removable bottom of the boring-cylinder in such manner that, when released, it will be forced outward by the weight of the earth above it, so that no labor is required to discharge the contents of the cylinder.

Figure 1:
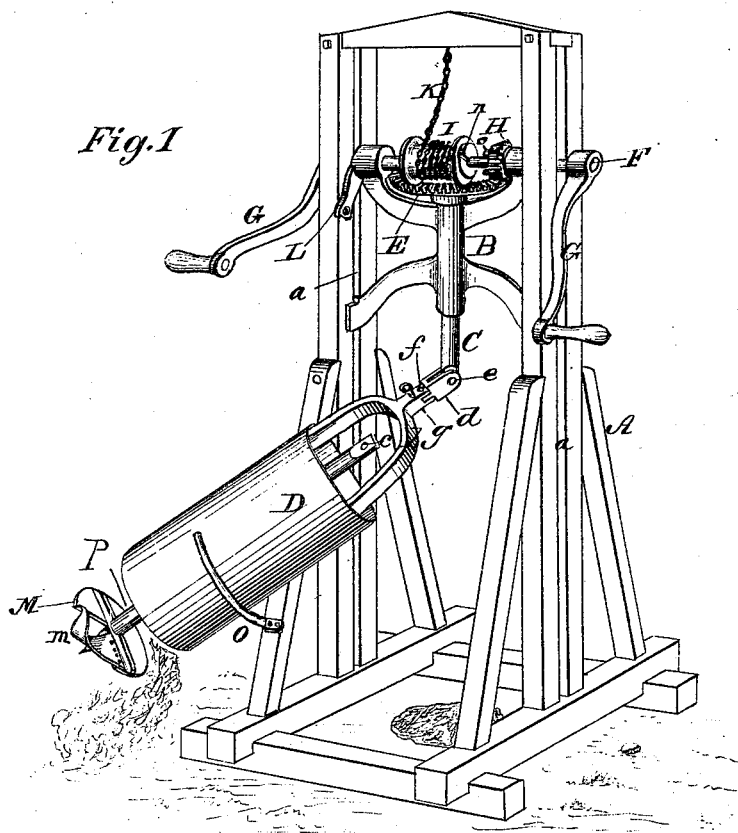
Figure 2:
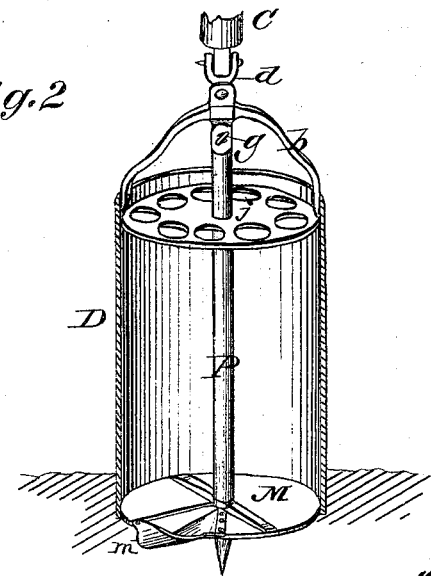

Figure 1 is a perspective view of our machine; and Fig. 2, a perspective view of the boring-cylinder, with its shell or body in section.

A represents the frame of the machine, consisting of a rectangular base provided with two vertical side bars or standards, each having a vertical slot, $a$, as shown in Fig. 1. B is a vertically-sliding carriage or head-block, mounted in the frame A and provided with ears or lugs which enter the slots $a$, so as to hold and guide the carriage. C is a vertical shaft mounted in the center of the carriage B and provided on the upper end with a bevel-gear wheel, E, as shown in Fig. 1. F is a horizontal shaft mounted in the top of the carriage B and extending out through the slots $a$, provided on its ends with hand-cranks G and at its middle with a pinion, H, which gears into the wheel E for the purpose of giving a rotary motion to the vertical shaft C. D is the boring-cylinder, provided at its upper end with a bale, $b$, which is connected, by means of a link, $d$, to the lower end of the vertical shaft C, as shown in both figures. The ends of the link $d$ are hinged to the bale and shaft, respectively, and the two hinge or pivot pins are arranged at right angles to each other, as shown in Fig. 2, in order to permit the cylinder to swing or tip in any direction, and to operate when its axis is not in line with that of the driving-shaft C. In place of the link, any of the common forms of universal joints may be employed, the only requirement being that they shall give a positive rotary motion to the boring-cylinder, and allow the same to be tipped or inclined. P is a shaft mounted centrally within the boring-cylinder, and connected at its upper end to the bale $b$ by means of a pin, $g$. This shaft is provided near its upper end with a circular skeleton plate, $j$, which fits closely within the cylinder, to brace and strengthen the same, and also serves as a guide to bring the shaft back to its place after being loosened. The shaft is provided at its lower end with the boring or cutting tool M, which consists merely of a circular plate fitting closely within the lower end of the cylinder and provided with a curved cutting-lip, $m$, as shown in Fig. 2. The end of the shaft extends through the cutter-plate, and is pointed to form a center and guide for the cutter. On the transverse shaft F there is mounted a loose spool or drum, I, having attached to it a chain, K, the upper end of which is secured to the top of the main frame. The spool is provided on one end with shoulders or studs $n$, and the pinion H provided on its inner side with corresponding shoulders $o$, so that, by moving the spool endwise, its shoulders may be caused to engage with those on the pinion, and thereby the spool caused to turn with the pinion and wind up the chain, so as to raise the carriage B and draw the boring-cylinder out of the ground. On the side of the frame there is pivoted a latch or dog, L, which, when the carriage B is raised, engages therewith, as shown in Fig. 1, to hold it up. The frame is also provided on one side with an arm, O, upon which to rest the lower end of the boring-cylinder when discharging the earth therefrom.

In operating the machine it is placed in the proper position, the spool I adjusted to turn loosely on its shaft, and the dog L released, so as to let the carriage B slide down and the lower end of the boring-cylinder rest upon the ground. Two operators, standing at the sides of the machine, then turn the cranks and give a rotary motion to the boring-cylinder. The point of the shaft P holds and guides the cylinder, while the lip $m$ cuts the earth loose and passes it up into the cylinder. The weight of the cylinder, carriage, and gearing causes the cylinder to sink into the earth as fast as the cutting-lip cuts the way. When the cylinder is filled with earth the spool K is moved endwise and locked to the pinion, and the cranks then turned until the cylinder is drawn out of the ground and supported by the dog L, engaging with the carriage B. The cylinder is then swung to one side and rested on the arm O, and the pin $g$ removed, so that the shaft P and the cutter-plate can slide down and leave the lower end of the cylinder open to permit the escape of the earth therefrom, as shown in Fig. 1.

By arranging the parts so that the bottom of the cylinder can be released and permitted to fall outward under the weight of the earth, while the cylinder remains stationary, I avoid the labor and also the extra devices which it is necessary to use in discharging the earth from those machines in which the bottom remains stationary and the cylinder is raised therefrom.

While, as before stated, our machine is intended more especially for boring post-holes, it may be used for boring wells and sinking tile at the bottom of wells, and for all similar purposes. When boring at a depth greater than the length of the cylinder, rods of the proper length will be interposed between the boring-cylinder and the shaft C. When the cylinder is used in soft wet earth or sand, which tends to run back out of the cylinder, a hinged valve may be applied to the inside of the same, to retain the material in the cylinder.

The use of the universal joint between the shaft C and the boring-cylinder permits the holes to be bored at an inclination, and also adapts the machine for boring vertical holes in a hill-side or on uneven ground.

Having thus described our invention, what we claim is—

1. The earth-boring machine, consisting of the main frame A, the vertically-sliding frame B, provided with the vertical shaft C, and the gearing and hand-cranks for operating the same, and the boring-cylinder D, suspended from the shaft by means of a universal joint, the parts being combined and arranged to operate as shown and described.

2. In combination with the laterally-swinging boring-cylinder D, the arm O on the frame to support the cylinder while the earth is being discharged.

3. In combination with the boring-cylinder D, connected permanently to the shaft C, the movable bottom plate M, provided with the shaft P and guide-plate $j$, and secured in place by a pin, $g$, as shown, so that when the pin is removed the bottom will be forced outward by the pressure of the earth above it.

MARTIN WAY.
THOMAS RIGHT WAY.

Witnesses:
A. P. LINN COCHRAN,
D. S. RUNYAN.